United States Patent
Oh et al.

(10) Patent No.: US 9,397,358 B2
(45) Date of Patent: Jul. 19, 2016

(54) MEMBRANE ELECTRODE ASSEMBLY HAVING LAYER FOR TRAPPING CATALYST AND FUEL CELL EMPLOYED WITH THE SAME

(75) Inventors: Yu Jin Oh, Seoul (KR); Hyuk Kim, Seoul (KR); Goyoung Moon, Seoul (KR)

(73) Assignee: LG CHEM, LTD., Seoul (KR)

( * ) Notice: Subject to any disclaimer, the term of this patent is extended or adjusted under 35 U.S.C. 154(b) by 1155 days.

(21) Appl. No.: 12/087,415

(22) PCT Filed: Dec. 23, 2006

(86) PCT No.: PCT/KR2006/005689
§ 371 (c)(1),
(2), (4) Date: Oct. 8, 2008

(87) PCT Pub. No.: WO2007/078080
PCT Pub. Date: Jul. 12, 2007

(65) Prior Publication Data
US 2009/0220841 A1    Sep. 3, 2009

(30) Foreign Application Priority Data
Jan. 4, 2006   (KR) .................. 10-2006-0000745

(51) Int. Cl.
*H01M 8/10* (2016.01)
*H01M 4/86* (2006.01)
*H01M 4/88* (2006.01)

(52) U.S. Cl.
CPC .......... *H01M 8/1011* (2013.01); *H01M 4/8605* (2013.01); *H01M 4/881* (2013.01); *H01M 4/8807* (2013.01); *H01M 8/1004* (2013.01); *Y02E 60/523* (2013.01); *Y10T 156/10* (2015.01)

(58) Field of Classification Search
None
See application file for complete search history.

(56) References Cited

U.S. PATENT DOCUMENTS

| | | | | |
|---|---|---|---|---|
| 5,521,020 | A * | 5/1996 | Dhar | 429/480 |
| 5,561,000 | A * | 10/1996 | Dirven et al. | 429/481 |
| 6,042,959 | A | 3/2000 | Debe et al. | |
| 2002/0041992 | A1* | 4/2002 | Zuber et al. | 429/44 |
| 2002/0045085 | A1 | 4/2002 | Formato et al. | |
| 2003/0157397 | A1* | 8/2003 | Barton et al. | 429/44 |
| 2004/0115499 | A1* | 6/2004 | Tani et al. | 429/30 |
| 2006/0134508 | A1* | 6/2006 | Ueda et al. | 429/44 |
| 2006/0234097 | A1* | 10/2006 | Boehm et al. | 429/30 |
| 2006/0269828 | A1* | 11/2006 | Tanaka et al. | 429/44 |

FOREIGN PATENT DOCUMENTS

| | | |
|---|---|---|
| JP | 2004-214045 A | 7/2004 |
| JP | 2005-174765 A | 6/2005 |
| KR | 10-20010061632 A | 7/2001 |

* cited by examiner

*Primary Examiner* — Ula C Ruddock
*Assistant Examiner* — Tony Chuo
(74) *Attorney, Agent, or Firm* — Dentons US LLP

(57) ABSTRACT

Disclosed herein are a membrane electrode assembly (MEA) for fuel cells, wherein the membrane electrode assembly has a porous membrane (a catalyst trapping layer) disposed at the opposite surface of a catalyst layer facing a polymer electrolyte membrane for preventing the loss of a catalyst, and a fuel cell including the same. The membrane electrode assembly has the effect of restraining the loss of the catalyst due to a liquid component, such as methanol, thereby improving the operating efficiency of the fuel cell. Especially, the membrane electrode assembly has the effect of minimizing the reduction in performance of the fuel cell due to the loss of the catalyst during the long-term operation.

3 Claims, 2 Drawing Sheets

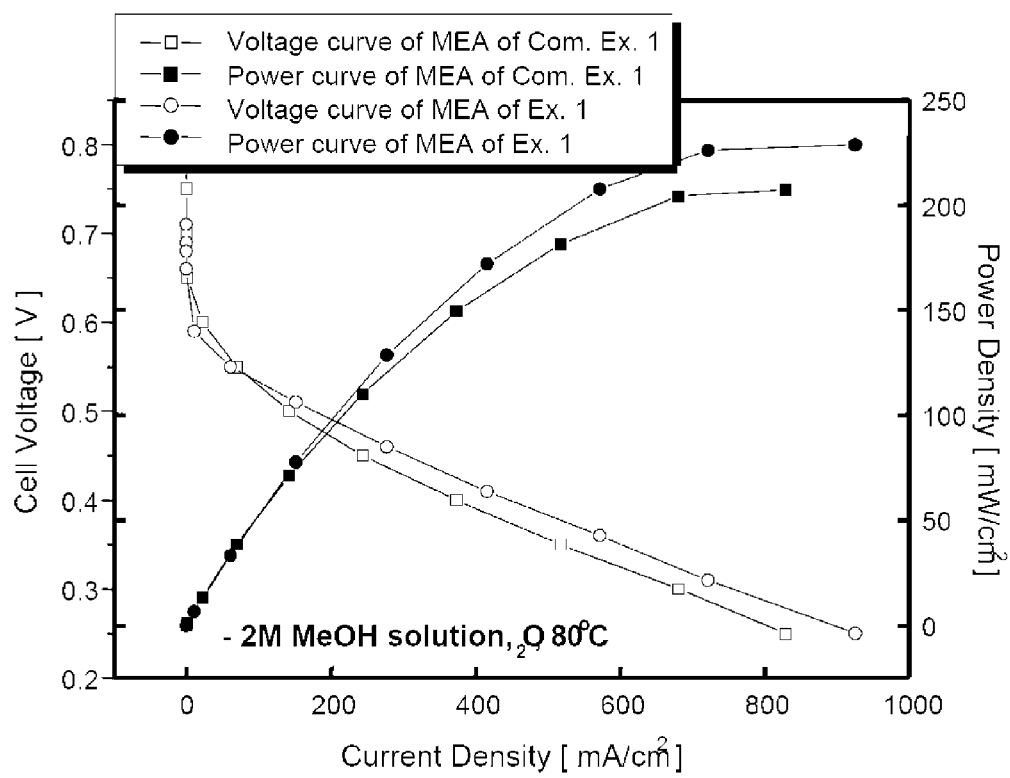

MEMBRANE ELECTRODE ASSEMBLY HAVING LAYER FOR TRAPPING CATALYST AND FUEL CELL EMPLOYED WITH THE SAME

This application claims the benefit of International Application Number PCT/KR/2006/005689 filed on Dec. 23, 2006 and Korean Application No. 10-2006-0000745 filed on Jan. 4, 2006, both of which are hereby incorporated by reference as if fully set forth herein.

TECHNICAL FIELD

The present invention relates to a membrane electrode assembly having a catalyst trapping layer and a fuel cell including the same, and, more particularly, to a membrane electrode assembly having a catalyst trapping layer, which is formed of a porous membrane and is disposed at the opposite surface of a catalyst layer facing a polymer electrolyte membrane for preventing the loss of a catalyst, and a fuel cell including the same, especially a direct methanol fuel cell.

BACKGROUND ART

The recent development of mobile devices requires a power source having higher output and capacity. As such a power source, a lithium secondary battery, which can be charged and discharged, has been generally used. However, the lithium secondary battery has several problems in exhibiting the performance of electronic equipment having a relatively large capacity sufficiently and for a long period of time. Specifically, when manufacturing a large-capacity lithium secondary battery, the manufacturing costs of the lithium secondary battery are very high due to the characteristics of materials constituting the lithium secondary battery, the safety of the lithium secondary battery is low, and it takes a long period of time to charge the lithium secondary battery.

For this reason, development on new power generation systems that satisfy the aforesaid requirements while overcoming the limits of the lithium secondary battery are being actively carried out. Among them is a fuel cell that is capable of providing power at high efficiency for a long period of time.

The fuel cell is a battery that generates electricity by changing fuels, such as hydrogen and methanol, into water through an electrochemical reaction. The fuel cell has been attracting considerable attention as an environmentally-friendly energy source that can overcome the problems of the lithium secondary battery. Representative examples of the fuel cell are hydrogen fuel cell using a gaseous fuel and a direct methanol fuel cell using a liquid fuel, on which much research is being carried out and some of which is in a commercialization stage.

The direct methanol fuel cell is a battery using the reaction between methanol and oxygen. Specifically, the methanol is decomposed at a fuel electrode of the direct methanol fuel cell to create electrons and protons. The protons pass through a polymer electrolyte membrane and react with the oxygen at an air electrode to create water.

A membrane electrode assembly (MEA), which is one of components constituting the fuel cell, is a part at which the electrochemical reaction between the methanol and the oxygen occurs. The membrane electrode assembly includes a fuel electrode, an air electrode, and a polymer electrolyte membrane. At the fuel electrode, electrons are created by an oxidation reaction of the methanol. At the air electrode, water is created by a reduction reaction of the oxygen (air). The fuel electrode and the air electrode are constructed in a structure in which the electrode catalyst layers are coated on the electrolyte membrane.

FIG. 1 is a sectional view typically illustrating such a membrane electrode assembly. As shown in FIG. 1, a membrane electrode assembly 10 is constructed in a structure in which a fuel electrode 30 and an air electrode 40 are attached to opposite major surfaces of a polymer electrolyte membrane 20, respectively. Also, the fuel electrode 30 and the air electrode 40 are constructed in a structure in which catalyst layers 34 and 44 are disposed between the polymer electrolyte membrane 20 and a gas diffusion layer 32 and between the polymer electrolyte membrane 20 and a gas diffusion layer 42, respectively.

A direct methanol fuel cell including the membrane electrode assembly 10 with the above-stated structure has a problem in that a catalyst washing phenomenon occurs due to the liquid-phase methanol introduced to the fuel cell 30, unlike a common solid polymer electrolyte fuel cell. Specifically, the catalyst of the catalyst layer 34 coated on the electrolyte membrane 20 is separated from the catalyst layer 34 due to the continuous flow of the methanol with the result that the oxidation reaction area of the methanol is reduced, and therefore, the performance of the membrane electrode assembly 10 is decreased. Especially when a direct methanol fuel cell system is operated (driven) for a long period of time, the catalyst washing phenomenon acts as a principal factor that lowers the performance of the fuel cell.

In this connection, the present invention proposes a membrane electrode assembly constructed in a structure in which an additional porous membrane is attached to the opposite surface of the catalyst layer facing the polymer electrolyte membrane. On the other hand, some of conventional arts disclose a technology for attaching an additional layer (an adhesive layer) to the opposite surface of the catalyst layer facing the polymer electrolyte membrane.

For example, Japanese Unexamined Patent Publication No. 2004-214045 discloses a technology for applying an adhesive layer including conductive carbon and a hydrogen ion conductive polymer electrolyte to a gas diffusion layer and welding the gas diffusion layer to a catalyst layer at high temperature and high pressure so as to securely attach the catalyst layer and the gas diffusion layer to each other in a hydrogen fuel cell. Consequently, this technology may be directly applied to a direct methanol fuel cell so as to restrain the catalyst washing phenomenon. However, it has been proved that the flow of a liquid component, such as methanol, in the direct methanol fuel cell is difficult due to the thermally welded adhesive layer, and therefore, the reaction efficiency is considerably lowered.

Also, Japanese Unexamined Patent Publication No. 2005-174765 discloses a technology for positioning an absorption material, such as carbon black, absorptive polymer, carbon aerogel, metal oxide, or absorptive fiber, between a catalyst layer and a gas diffusion layer in a fuel electrode so as to accomplish the operation of a hydrogen fuel cell at low temperature. Consequently, this technology may be directly applied to a direct methanol fuel cell so as to restrain the catalyst washing phenomenon. As the direct methanol fuel cell is a system in which a liquid component, such as methanol, mainly acts, however, the absorption material is impregnated with a large amount of the liquid component in the above-described assembly structure, and the liquid component further decreases a coupling force of the catalyst layer, whereby the catalyst washing phenomenon is rather accelerated.

Consequently, there is a high necessity of a technology for restraining the phenomenon in which the catalyst is washed due to the liquid component in a direct liquid type fuel cell, such as a direct methanol fuel cell, without the reduction in operating efficiency of the fuel cell.

DISCLOSURE OF INVENTION

Technical Problem

Therefore, the present invention has been made to solve the above problems, and other technical problems that have yet to be resolved.

As a result of a variety of extensive and intensive studies and experiments to solve the problems as described above, the inventors of the present invention have found that, when a porous membrane is disposed at the opposite surface of a catalyst layer facing a polymer electrolyte membrane, for example, between the catalyst layer and a gas diffusion layer, a liquid component, such as methanol, freely moves without the reduction in operating efficiency of a fuel cell or even with the acceleration of the operating efficiency, whereby the occurrence of a phenomenon in which the catalyst is washed due to the liquid component, i.e., a phenomenon in which the catalyst is swept due to the liquid component, is prevented, and therefore, the service-life characteristics of the fuel cell are considerably improved. The present invention has been completed based on these findings.

Technical Solution

In accordance with one aspect of the present invention, the above and other objects can be accomplished by the provision of a membrane electrode assembly (MEA) for fuel cells, wherein the membrane electrode assembly has a porous membrane ("a catalyst trapping layer") disposed at the opposite surface of a catalyst layer facing a polymer electrolyte membrane for preventing the loss of a catalyst.

In the membrane electrode assembly according to the present invention, the catalyst is prevented from being discharged by the catalyst trapping layer that allows a liquid component to pass therethrough and does not allow a solid component, i.e., the catalyst, to pass therethrough, while the flow of the liquid component, which is necessary for the operation of the fuel cell, is not disturbed. Consequently, the operating efficiency of the fuel cell is improved. Especially, the service-life characteristics of the fuel cell are greatly improved.

The catalyst trapping layer may be constructed in a porous structure. For example, the catalyst trapping layer may be constructed in a thin membrane structure including pores having a size to allow a liquid component to pass therethrough and not to allow the catalyst to pass therethrough.

In a preferred embodiment, the catalyst trapping layer is constructed in a structure in which pores of the thin membrane are filled with a polymer electrolyte or in a structure in which a polymer electrolyte is coated on one or both major surfaces of the thin membrane having a plurality of pores. In these structures, the occurrence of a catalyst washing phenomenon is prevented due to the polymer electrolyte filled in the pores or coated on at least one major surface of the thin membrane, although the pores of the catalyst trapping layer have a greater diameter than that of the catalyst.

Preferably, the polymer electrolyte is a material having ion conductance sufficient such that it does not disturb the introduction of the liquid component, which is a fuel, into the catalyst layer while being diffused and chemical stability sufficient not to react with the liquid component. According to circumstances, the polymer electrolyte may be a material that is mixed with an alcohol-based liquid and well diffused for easy coating. The polymer electrolyte may be acid and base, such as perfluorosulfonic acid polymer, doped polybenzimidazole, polyetherketone, and polysulfone, which may be used individually or in a combination of two or more.

The porous membrane constituting the catalyst trapping layer is not particularly restricted so long as the porous membrane is made of a material that is physically and chemically stable in reaction conditions of the fuel cell and has a plurality of pores. Preferably, the porous membrane is made of a material identical or similar to a separator used when constructing an electrode assembly of a secondary battery.

Specifically, the porous membrane may be constructed in a thin membrane structure having a pore thickness of 0.01 to 20 µm, a thickness of 0.1 to 100 µm and a porosity of 30 to 80%, and the porous membrane may be made of polyolefin-based film, such as polyethylene or polypropylene, having chemical resistance and hydrophobicity, a sheet of glass fiber or a polyolefin-based material, such as polyethylene, non-woven cloth, or craft paper. Preferably, the porous membrane has a thickness of 1 to 30 µM and a porosity of 40 to 60%.

According to circumstances, the membrane electrode assembly is manufactured by coating gel polymer coated on one or both major surfaces of the porous membrane and performing thermal welding, whereby the catalyst trapping layer is coupled to the catalyst layer and/or a gas diffusion layer with a high coupling force. The gel polymer may be polyethylene oxide, polyvinylidene fluoride, or polyacrylonitrile.

The membrane electrode assembly according to the present invention may be manufactured by various methods. For example, the membrane electrode assembly may be manufactured by coating the catalyst layer on the polymer electrolyte membrane, attaching the catalyst trapping layer to a gas diffusion layer, and tightly joining the catalyst layer and the catalyst trapping layer. Alternatively, the membrane electrode assembly may be manufactured by attaching the catalyst trapping layer to a gas diffusion layer, coating the catalyst layer on the catalyst trapping layer, and joining polymer electrolyte membrane thereto. However, the present invention is not limited by these methods, and various other methods may be applied to the present invention.

Preferably, the catalyst trapping layer is attached to a fuel electrode where the liquid component flows. However, the catalyst trapping layer may be also attached to an air electrode where water is created by a reduction reaction of oxygen.

In accordance with another aspect of the present invention, there is provided a fuel cell including the membrane electrode assembly.

The fuel cell according to the present invention is preferably used in a fuel cell using a liquid component as fuel. Especially, the fuel cell according to the present invention is preferably used in a direct methanol fuel cell.

The detailed structure of direct liquid type fuel cells, including the direct methanol fuel cell, and a method of manufacturing the same are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a graph illustrating the results of voltage and power density measurements of membrane electrode assemblies constructed according to Example 1 and Comparative Example 1.

MODE FOR THE INVENTION

Now, preferred embodiments of the present invention will be described in detail with reference to the accompanying drawings. It should be noted, however, that the scope of the present invention is not limited by the illustrated embodiments.

Figure 1:
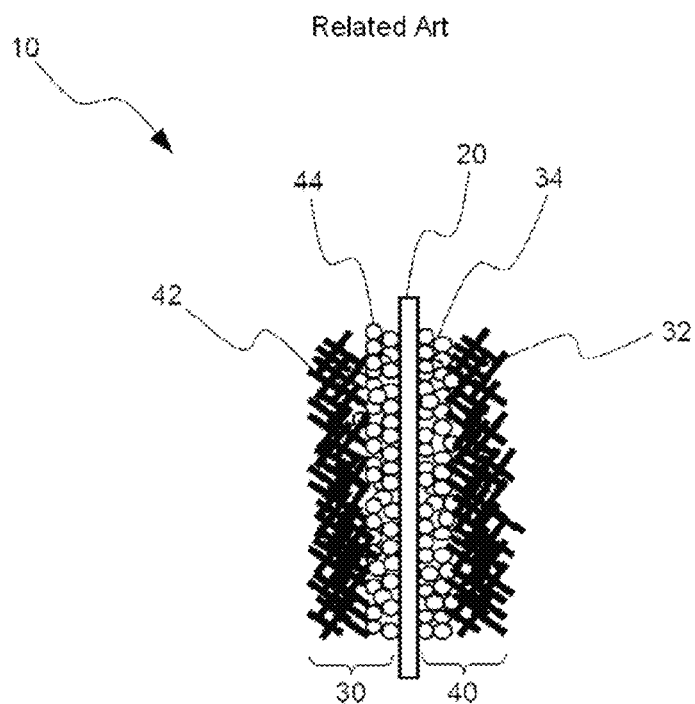
FIG. 1 is a sectional view typically illustrating a conventional membrane electrode assembly.
Figure 2:
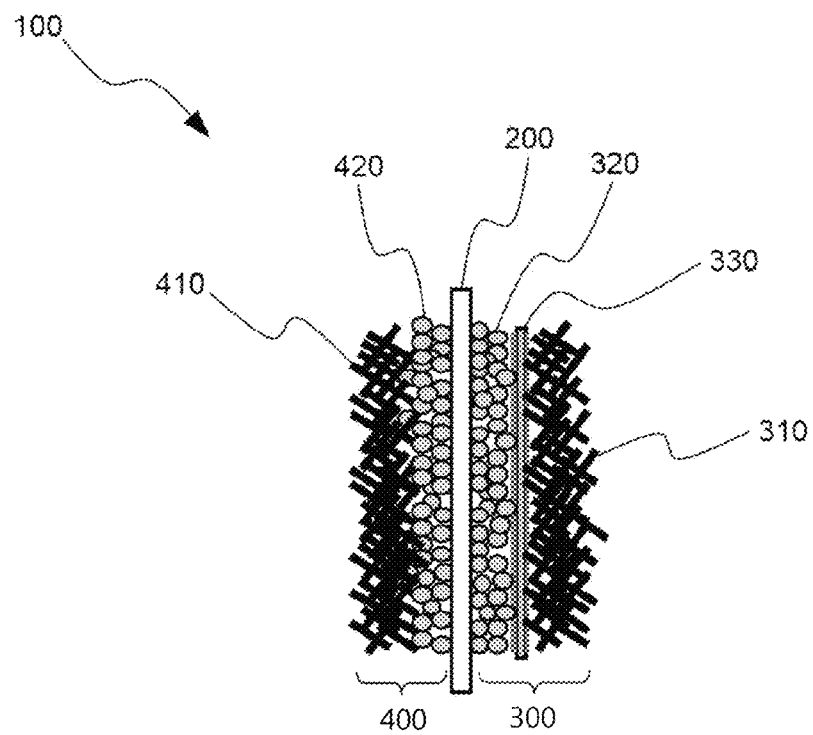
FIG. 2 is a sectional view typically illustrating a membrane electrode assembly having a catalyst trapping layer disposed at a fuel electrode side according to a preferred embodiment of the present invention.

FIG. 2 is a sectional view typically illustrating a membrane electrode assembly having a catalyst trapping layer disposed at a fuel electrode side according to a preferred embodiment of the present invention.

Referring to FIG. 2, a membrane electrode assembly 100 is a membrane electrode assembly for direct methanol fuel cells, which is constructed in a structure in which a fuel electrode 300 and an air electrode 400 are attached to opposite major surfaces of a polymer electrolyte membrane 200, respectively.

The fuel electrode 300 is constructed in a structure in which a catalyst trapping layer 330, which is formed of a porous membrane, is disposed between a gas diffusion layer 310 and a catalyst layer 320. The gas diffusion layer 310 is generally made of carbon paper or carbon cloth having a porosity of 70 to 80%. That is, the gas diffusion layer 310 is constructed in a coarse structure. Consequently, methanol, specifically, a mixture of methanol and water is easily introduced through the gas diffusion layer 310, and is then moved toward the catalyst layer 320 while being uniformly diffused. In the conventional art, there is a high tendency for the catalyst of the catalyst layer 320 to be lost due to the coarse structure of the gas diffusion layer 310. According to the present invention, on the other hand, the catalyst trapping layer 330 is disposed at the opposite surface of the catalyst layer 320 facing the polymer electrolyte membrane 200, i.e., the rear surface of the catalyst layer 320, and therefore, the catalyst is restrained from being washed from the catalyst layer 320.

The catalyst trapping layer 330 is disposed at the entire rear surface of the catalyst layer 320. However, it is also possible to partially dispose the catalyst trapping layer 330 at the rear surface of the catalyst layer 320. For example, even when the catalyst trapping layer 330 is disposed to cover approximately 60 to 80% of the entire area of the catalyst layer 320 about the middle of the catalyst layer 320, the catalyst may be greatly restrained from being washed from the catalyst layer 320.

On the other hand, the air electrode 400 only includes a gas diffusion layer 410 and a catalyst layer 420. That is, the air electrode does not include a catalyst trapping layer corresponding to the catalyst trapping layer 330 of the fuel electrode 300. The air electrode 400 is an electrode at which protons moved from the fuel electrode 300 react with oxygen in the air to create water. The catalyst washing phenomenon is not serious as compared to the fuel electrode 300. However, the catalyst may be washed from the catalyst layer 420 due to the water resulting from the reaction, and therefore, a catalyst trapping layer may be disposed at the air electrode 400 as in the fuel electrode 300.

Example 1

A catalyst and 15 weight percent of Nafion powder, having a size of 1 to 3 μm, based on the amount of the catalyst were prepared and uniformly mixed using a mixer. The catalyst used for the air electrode was Pt black, and the catalyst used for the fuel electrode was PtRu black. The catalyst was loaded into a gun, and was then coated on the surface of the gas diffusion layer through a dry injection coating process. In order to form the catalyst trapping layer, the Nafion powder was coated on opposite major surfaces of a polyethylene membrane having a porosity of 50% and a thickness of 12 μm. These and a Nafion-based polymer electrolyte membrane having a thickness of approximately 125 μm. were attached to one another through a hot pressing process. In this way, a membrane electrode assembly was manufactured. The voltage and the power density of the membrane electrode assembly were measured at a currency density of 0 to 1000 mA/cm$^2$. The results are shown in FIG. 3.

Comparative Example 1

A membrane electrode assembly was manufactured in the same method as Example 1 except that the fuel electrode was formed while the catalyst trapping layer was not disposed between a carbon paper and the catalyst layer. The results of voltage and the power density measurements of the membrane electrode assembly are shown in FIG. 3.

As can be seen from FIG. 3, the membrane electrode assembly for direct methanol fuel cells manufactured according to Example 1 of the present invention had higher voltage and power density than the membrane electrode assembly manufactured according to Comparative Example 1. It is generally expected that, when the catalyst trapping layer is attached to the fuel electrode, the smooth flow and uniform distribution of a liquid component, such as methanol, are difficult, and therefore, the voltage and the power density are lowered. Contrary to the general expectation, however, the experiment results revealed that the operational performance was improved when using the membrane electrode assembly manufactured according to Example 1. It is estimated that this is because the methanol is diffused without difficulty due to the polymer electrolyte filled in the porous membrane of the catalyst trapping layer, whereas the loss of the catalyst is less than Comparative Example 1.

In addition, the results of relevant experiments to confirm the service-life characteristics of the membrane electrode assembly according to Example 1 of the present invention revealed that the amount of lost catalyst was greatly reduced as compared to the membrane electrode assembly manufactured according to Comparative Example 1, and therefore, the performance of the fuel cell was effectively maintained even during the long-term operation.

INDUSTRIAL APPLICABILITY

As apparent from the above description, the membrane electrode assembly for fuel cells according to the present invention is constructed in a structure in which the catalyst trapping layer is attached to the rear surface of the catalyst layer. Consequently, the present invention has the effect of restraining the loss of the catalyst due to a liquid component, such as methanol, thereby improving the operating efficiency of the fuel cell. Especially, the present invention has the effect of minimizing the reduction in performance of the fuel cell due to the loss of the catalyst during the long-term operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A direct methanol fuel cell comprising a membrane electrode assembly (MEA), wherein the membrane electrode assembly comprises a polymer electrolyte membrane, a fuel electrode and an air electrode, wherein the fuel electrode comprises a catalyst layer, a gas diffusion layer, and a catalyst trapping layer disposed at the opposite surface of the catalyst layer facing the polymer electrolyte membrane for preventing the loss of a catalyst, wherein the catalyst trapping layer is constructed in a thin membrane structure including pores having a size to allow a liquid component to pass therethrough and not to allow the catalyst to pass therethrough, wherein the catalyst trapping layer is formed of a porous membrane, the catalyst trapping layer that being disposed to cover approximately 60 to 80% of the entire area of the catalyst layer about the middle of the catalyst layer is coupled to the catalyst layer and/or the gas diffusion layer with a coupling force by thermal welding, and the porous membrane is a polyolefin-based material, wherein the catalyst trapping layer is constructed in a structure in which a polymer electrolyte is coated on one or both major surfaces of the porous membrane having a plurality of pores, wherein the porous membrane constituting the catalyst trapping layer is constructed in a thin membrane structure having a pore size of 0.01 to 20 μm, a thickness of 1 to 30 μm, and a porosity of 40 to 60%, wherein the polymer electrolyte is one or more selected from a group consisting of perfluorosulfonic acid polymer, doped polybenzimidazole, polyetherketone, and polysulfone, and wherein the air electrode only includes a gas diffusion layer and a catalyst layer.

2. The direct methanol fuel cell according to claim 1, wherein the membrane electrode assembly is manufactured by coating the catalyst layer on the polymer electrolyte membrane, attaching the catalyst trapping layer to the gas diffusion layer, and tightly joining the catalyst layer and the catalyst trapping layer.

3. The direct methanol fuel cell according to claim 1, wherein the membrane electrode assembly is manufactured by attaching the catalyst trapping layer to the gas diffusion layer, coating the catalyst layer on the catalyst trapping layer, and joining the polymer electrolyte membrane thereto.

* * * * *